United States Patent [19]

Takahashi et al.

[11] 4,192,934

[45] Mar. 11, 1980

[54] EQUIPMENT FOR POLYMERIZATION OF VINYL CHLORIDE MONOMERS AND POLYMERIZATION PROCESS USING THE SAME

[75] Inventors: Tsukasa Takahashi; Takeshi Sekihara; Tomoyuki Emura; Masayoshi Miki, all of Niihama, Japan

[73] Assignee: Sumitomo Chemical Company, Limited, Osaka, Japan

[21] Appl. No.: 928,970

[22] Filed: Jul. 28, 1978

[30] Foreign Application Priority Data

Aug. 9, 1977 [JP] Japan .................................. 52-95869
Sep. 22, 1977 [JP] Japan .................................. 52-11439

[51] Int. Cl.$^2$ ........................... B01J 8/00; C08F 2/16; C08F 14/06
[52] U.S. Cl. ................................... 526/62; 422/131; 526/344; 526/344.1
[58] Field of Search ........... 526/62; 23/252 R, 252 A, 23/285, DIG. 1; 422/131

[56] References Cited

U.S. PATENT DOCUMENTS

| 2,975,162 | 3/1961 | Iloff ........................................ 526/62 |
| 3,966,695 | 6/1976 | Flatau et al. ........................... 526/62 |
| 4,049,895 | 9/1977 | McOnie et al. ......................... 526/62 |

*Primary Examiner*—John Kight, III
*Attorney, Agent, or Firm*—Stevens, Davis, Miller & Mosher

[57] ABSTRACT

Equipments for polymerization of vinyl chloride monomers characterized in that the inside wall of the polymerization vessel and/or the surface of attachments to the vessel which are brought into contact with said monomers are wholly or partially made of mirror-polished ferritic stainless steel containing 15 to 40% by weight of chromium, 0.5 to 5% by weight of molybdenum, not more than 0.5% by weight of nickel, not more than 0.05% by weight of carbon and not more than 0.05% by weight of nitrogen, or mirror-polished duplex-phase stainless steel comprising a ferrite phase and an austenitic phase.

4 Claims, No Drawings

EQUIPMENT FOR POLYMERIZATION OF VINYL CHLORIDE MONOMERS AND POLYMERIZATION PROCESS USING THE SAME

The present invention relates to equipment for polymerization of vinyl chloride monomer alone or mixtures comprising vinyl chloride monomer as a main component and a monomer copolymerizable therewith (referred to as "vinyl chloride monomers" hereinafter), and a polymerization process using the same.

More particularly, the present invention relates to equipment for polymerization of vinyl chloride monomers in which the inside wall of the polymerization vessel and/or the surface of attachments to the vessel which are brought into contact with said monomers (referred to as "inside wall of polymerization vessel and the like" hereinafter) are wholly or partially made of mirror-polished ferritic stainless steel or mirror-polished duplex phase stainless steel comprising a ferritic phase and an austenitic phase (referred to as "duplex phase stainless steel" hereinafter) whereby attachment of the polymers to the inside wall and surface (the so-called scale) is completely to substantially prevented and corrosion of the inside wall and surface owing to chlorine ions is substantially prevented, and to a polymerization process using the same.

In the industrial-scale production of vinyl chloride polymers, glass-lined polymerization vessels or austenitic stainless steel (Cr-Ni series stainless steel) ones have so far been used as the polymerization equipment. But, the glass-lined polymerization vessels have the following weak points: The glass layer is so weak that it is damaged by mechanical or thermal shock; and the heat transfer coefficient to determine production capacity is small. Consequently, these weak points cancel out the advantages of the glass-lined vessels, for example, a weak adhesion of scale to vessel and high resistance to chlorine ion corrosion.

On the other hand, the austenitic stainless steel polymerization vessels are superior to the glass-lined ones in that the heat transfer coefficient is large. But they have the following fatal drawbacks: Resistance to corrosion and pitting corrosion by chlorine ions generated on polymerization is low; the amount of scale attached due to the corrosion and pitting corrosion is large; and adhesion between the scale and vessels is firm.

Formation of the scale to the inside wall of polymerization vessels causes a reduction in heat transfer ability which results in a reduction in production capacity, and causes a reduction in the efficiency of the polymerization cycle owing to removal of the scale, and causes an increase in the cost required for removal of the scale. Consequently, the scale formation is not desirable from the standpoint of industrial production.

For the reasons as described above, the inventors extensively studied to develop a method how to prevent completely to substantially formation of the scale and to prevent corrosion by chlorine ions of the inside wall of polymerization vessel and the like. The inventors thus attained the present invention.

An object of the present invention is to provide equipment for polymerization of vinyl chloride monomers in which the formation of scale is prevented completely to substantially.

Another object of the present invention is to provide a process for polymerization of vinyl chloride monomers using the aforesaid polymerization equipment.

Other objects and advantages will become apparent from the following description.

The present invention provides equipment for polymerization of vinyl chloride monomers characterized in that the inside wall of the polymerization vessel and/or the surface of attachments to the vessel which are brought into contact with said monomers are wholly or partially made of mirror-polished ferritic stainless steel containing 15 to 40% by weight of chromium, 0.5 to 5% by weight of molybdenum, not more than 0.5% by weight of nickel, not more than 0.05% by weight of carbon and not more than 0.05% by weight of nitrogen, or mirror-polished duplex phase stainless steel comprising a ferritic phase and an austenitic phase, and a process for polymerization of vinyl chloride monomers characterized by subjecting vinyl chloride monomer alone or mixtures comprising vinyl chloride monomer as a main component and a monomer copolymerizable therewith to radical polymerization in the presence of a radical-generating catalyst in an aqueous medium using said equipment for polymerization.

As to the ferritic stainless steel used in the present invention, the chromium content is 15 to 40% by weight, preferably 17 to 35% by weight. When the content is less than 15% by weight, the resistance to chlorine ion corrosion is too poor to meet practical purposes. While the content exceeding 40% by weight is not desirable since the material cost becomes too high. The molybdenum content is 0.5 to 5% by weight, preferably 1 to 3% by weight. When the content is less than 0.5% by weight, the corrosion resistance improving effect due to interaction between molybdenum and chromium becomes insufficient. While even though the content exceeds 5% by weight, the effect is not so much remarkable for an increase in the material cost. The nickel content is not more than 0.5% by weight, preferably not more than 0.3% by weight. The content exceeding 0.5% by weight causes a large reduction in resistance to stress corrosion cracking. The contents of carbon and nitrogen are each not more than 0.05% by weight, preferably not more than 0.02% by weight. In either case, the content exceeding 0.05% by weight is not desirable since it causes a remarkable reduction in corrosion resistance, processability and weldability.

The ferritic stainless steel of the present invention may of course contain not more than several percent of other elements in addition to those mentioned above. For example, it matters little that the ferritic stainless steel contains not more than several percent of titanium, niobium, zirconium and the like which are commonly added to ferritic stainless steel as a stabilizing element. The remaining element is of course iron.

The duplex phase stainless steel (another name: ferrite.austenite series stainless steel) used in the present invention generally contains 17 to 30% by weight of chromium and 2 to 8% by weight of nickel. This stainless steel may contain molybdenum, zirconium, copper, tungsten and the like, in addition to the foregoing elements, which are generally added for the purpose of improvement in corrosion resistance and/or stabilization of structure. Furthermore, it may contain nitrogen for the purpose of improvement in strength. The remaining element is of course iron.

In addition to use of the ferritic stainless steel or duplex phase stainless steel having the foregoing compositions, preparation of a mirror-polished surface of the stainless steel is essential to the present invention. In the present invention, when the mirror-polished surface is measured for mirror gloss, with a mirror coated with vacuum-evaporated silver as a standard and its gloss as 100%, according to the method No. 2 for the measurement of mirror gloss specified in JIS Z-8741 (1962), a preferred value of the mirror gloss is 70% or more.

By mirror-polishing the ferritic stainless steel or duplex phase stainless steel having the foregoing compositions to a mirror gloss of 70% or more, preferably 75% or more, the object of preventing the scale formation completely to substantially can be achieved.

The mirror-polishing may be carried out by any of the following methods: The surface is mechanically ground with a buff (grade, No. 400 or more) and then mirror-polished with abrasives for stainless steel such as polishing rods; the surface is mechanically ground with a buff (grade, No. 300 or more) and then mirror-polished by electropolishing; and the surface is mirror-polished by simultaneous application of mechanical buffing and electropolishing.

The test pieces having a mirror gloss of 70% or more, which are obtained by mirror-polishing of the ferritic stainless steel and duplex phase stainless steel of the present invention, showed no formation of scale and remarkably a superior resistance to corrosion. This may be considered as due to the following reason: Common austenitic stainless steel produces pitting corrosion by the action of chlorine ions even though mirror-polished, and this pitting corrosion causes scale formation and further promotes the formation; and therefore the general corrosion resistance of austenitic stainless steel is not displayed in the polymerization of vinyl chloride monomers.

On the other hand, under general conditions of use, the ferritic stainless steel and duplex phase stainless steel of the present invention have been considered as extremely superior to austenitic stainless steel in resistance to stress corrosion cracking, but as inferior or equal to austenitic stainless steel in resistance to pitting corrosion and resistance to crevice corrosion. Contrary to the expectations, however, the inventors' experiments showed that the steels of the present invention caused substantially no formation of scale and displayed extremely superior corrosion resistance.

This may be considered as due to the following reason: Since a high level of mirror-polishing is applied to the ferritic stainless steel and duplex phase stainless steel, a dense and firm, special passive film is formed on the surface of said stainless steel; and thus the scale formation is prevented and a higher corrosion resistance than expected is displayed.

The embodiments of the present invention are as follows: A method of making all the major structures of polymerization vessels out of the ferritic stainless steel or duplex phase stainless steel specified in the present invention; a method of making the major structures of polymerization vessels out of mild steel or high-tensile steel and inside wall thereof by strip-lining (cladding) or explosion-lining (cladding) of said ferritic stainless steel or duplex phase stainless steel and a method of using the so-called clad steel which is made by sticking said stainless steel on the surface of mild steel by explosion-lining or roll-lining. It is desirable to select the proper method taking into account the size of the polymerization vessel and economy.

The process of the present invention displays the effect to the maximum in radical polymerization of vinyl chloride monomers in an aqueous medium, that is, in suspension polymerization and emulsion polymerization. The same effect may also be expected in bulk polymerization and solution polymerization using a small amount of water.

In the suspension polymerization, oil-soluble catalysts and suspension stabilizers commonly used in suspension polymerization of vinyl chloride are used. As the oil-soluble catalyst, there may be given diacyl peroxides (e.g. lauroyl peroxide), alkyl peroxyesters (e.g. tert-butyl peroxypivalate), dialkyl peroxydicarbonates (e.g. diisopropyl peroxydicarbonate), acetyl alkyl peroxides (e.g. acetyl cyclohexyl sulfonylperoxide), azo catalysts [e.g. azobis(2,4-dimethylvaleronitrile)] and mixtures thereof. But the present invention is not limited to these examples. The amount of the catalyst is one which is commonly used in suspension polymerization of vinyl chloride, and it is generally 0.005 to 0.5% by weight based on the monomer.

As the suspension stabilizer, there may be given water-soluble synthetic high polymers (e.g. partially saponified polyvinyl alcohol), cellulose derivatives (e.g. hydroxypropoxymethyl cellulose), natural high polymers (e.g. gelatin) and the like.

In the emulsion polymerization, water-soluble catalysts and emulsifiers commonly used in emulsion polymerization of vinyl chloride are used. The water-soluble catalyst includes persulfates (e.g. potassium persulfate), hydrogen peroxide and redox catalysts resulting from a reducing agent and the former compounds. The emulsifier includes anionic surface active agents such as alkali metal salts of alkylsulfuric acid (e.g. sodium laurylsulfate), alkali metal salts of alkylarylsulfonic acid (e.g. sodium dodecylbenzene sulfonate) and the like.

The polymerization is generally carried out at 40° to 80° C., and in some cases a chain transfer agent or cross-linking agent may be added.

As the monomers copolymerizable with vinyl chloride used in the present invention, there may be mentioned for example α-olefins (e.g. ethylene, propylene), halogenated vinyls other than vinyl chloride, halogenated vinylidenes (e.g. vinylidene chloride), vinyl ethers (e.g. methyl vinyl ether, lauryl vinyl ether) and vinyl esters (e.g. vinyl acetate).

By the process of the present invention described above in detail, the formation of scale can be prevented completely to substantially. Thus, the operation of cleaning the inside wall of polymerization vessels, which is carried out after polymerization, becomes very easy. For example, the inside wall can be cleaned by a mere jet of low-pressure water (50 kg/cm$^2$ or less). Consequently, the present invention has a very large industrial significance.

EXAMPLE 1

On the lower part of a buffle (a part completely soaked in reaction solution during polymerization) in a 22-m$^3$ glass-lined polymerization vessel for production of vinyl chloride polymers, were mounted test pieces [shape: 100 mm × 100 mm × 2 mm (thick)]. The material and level of surface-polishing of the test piece are shown in Table 1, and the chemical composition of the stainless steel used is shown in Table 2.

To the polymerization vessel were added 10,000 kg of deionized water, 5.6 kg of polyvinyl alcohol (average polymerization degree, 850; saponification degree, 75%) and 2.8 kg of a toluene solution containing 50% by weight of diisopropyl peroxydicarbonate. After de-aeration in the vessel, 7,000 kg of vinyl chloride monomer was added, followed by polymerization at 57° C.

with stirring. Pressure in the vessel at the beginning of polymerization was 8.7 kg/cm²G. When the pressure dropped by 2 kg/cm² after 7 hours, the polymerization was stopped and unreacted vinyl chloride monomer was recovered. After the contents in the vessel were withdrawn, the vessel was washed with low-pressure water of 15 kg/cm²G.

A cycle of these operations was repeated for about 6 months in 12 hours/cycle on the average, and thus 360 batches of polymerization were produced. During that period, the test pieces were detached at the times shown in Table 1, evaluated for degrees of scale attachment and corrosion and re-mounted followed by continuing the test.

The followings are apparent from the results in Table 1: The test pieces, No. 1 to No. 6, of the material and the level of surface-finishing according to the present invention do not show substantial scale formation (which means firm scale not removable by washing with low-pressure water of 15 kg/cm²G) at all not only over a short period of time but also over a long period of time, and besides they show slight progress of corrosion. On the other hand, the test pieces, No. 7 to No. 9, which are made of the ferritic stainless steel specified in the present invention but with poor surface-finishing, and those, No. 10 to No. 13, which are made of stainless steel other than those specified in the present invention, show firm scale formation and rapid progress of corrosion, and the conditions become worse as the test period is prolonged.

Table 1

| Test piece No. | Material | State of surface-finishing Method | Mirror[1] gloss(%) | After first cycle Scale[2] attachment (g/m²) | After 60th cycle Scale[2] attachment (g/m²) | After 60th cycle Corrosion state (g/m²hr) | After 360th cycle Scale[2] attachment (g/m²) | After 360th cycle Corrosion state (g/m²hr) | After 360th cycle Surface state |
|---|---|---|---|---|---|---|---|---|---|
| 1 | YUS-190 | Polishing with a buff #400 followed by electro-polishing | 87 | 0 | 0 | 0.001 | 0 | 0.001 | Sound |
| 2 | E-Brite 26-1 | Same as above | 84 | 0 | 0 | 0.001 | 0 | 0.001 | Sound |
| 3 | SHOMAC | Same as above | 86 | 0 | 0 | 0.002 | 0 | 0.003 | Sound |
| 4 | YUS-190 | Polishing with a buff #400 followed by mirror-polishing | 79 | 0 | 0 | 0.001 | 0 | 0.002 | Sound |
| 5 | E-Brite 26-1 | Same as above | 78 | 0 | 0 | 0.002 | 0 | 0.002 | Sound |
| 6 | SHOMAC | Same as above | 76 | 0 | 0 | 0.003 | 0 | 0.005 | Sound |
| 7 | YUS-190 | Polishing alone with a buff #300 | 62 | 21 | 43 | 0.009 | 130 | 0.105 | Many pits |
| 8 | E-Bright 26-1 | Same as above | 65 | 48 | 63 | 0.007 | 96 | 0.079 | Many pits |
| 9 | SHOMAC | Same as above | 65 | 45 | 50 | 0.007 | 115 | 0.090 | Many pits |
| 10 | YUS 304 | Polishing with a buff #400 followed by electro-polishing | 82 | 38 | 67 | 0.015 | 270 | 0.316 | Many pits |
| 11 | YUS 316 | Same as above | 84 | 21 | 46 | 0.008 | 130 | 0.120 | Many pits |
| 12 | YUS 316L | Same as above | 85 | 15 | 45 | 0.007 | 95 | 0.065 | Many pits |
| 13 | YUS 434 | Same as above | 83 | 52 | 91 | 0.023 | 230 | 0.203 | Many pits |

Note:
[1] Mirror gloss is measured according to the method No. 2 of JIS Z 8741 (1962) (the gloss of a mirror coated with vacuum-evaporated silver is taken as 100%).
[2] Values after washing with low-pressure water of 15 kg/cm G.

Table 2

Chemical composition of stainless steel

| Trade name | Manufacturing company | Cr | Mo | Ni | C | N | Others | Remark |
|---|---|---|---|---|---|---|---|---|
| YUS 190 | Shin-nippon Seitetsu Co. | 19.0 | 2.1 | 0.12 | 0.008 | 0.009 | Ti 0.15 Nb 0.27 | Ferritic stainless steel specified in the present invention |
| E-Brite 26-1 | Airco Co. (U.S.A.) | 26.0 | 1.0 | 0.12 | 0.001 | 0.01 | | Same as above |
| SHOMAC | Showa Denko Co. | 30.0 | 2.0 | 0.18 | 0.003 | 0.007 | | Same as above |
| YUS 434 | Shin-nippon Seitetsu Co. | 16.5 | 1.0 | — | 0.12 | 0.2 | | Ferritic stainless steel out of the scope of the present invention |
| YUS 304 | Shin-nippon Seitetsu Co. | 19.1 | — | 8.5 | 0.08 | 0.1 | Mn 1.5 | Austenitic stainless steel |
| YUS 316 | Shin-nippon Seitetsu Co. | 16.9 | 2.5 | 10 | 0.07 | 0.1 | Mn 1.7 | Same as above |
| YUS 316L | Shin-nippon Seitetsu Co. | 16.8 | 2.5 | 10 | 0.02 | 0.1 | | Same as above |

EXAMPLE 2

The whole inside wall of a 100-liter SUS 316L polymerization vessel was strip-lined with a tanzaku-form thin plate (0.5 mm thick) made of YUS 190 (chemical composition is shown in Table 2) and surface-finished sufficiently smoothly by mechanical polishing. The wall was then electropolished at 70° C. and current density of 50 A/dm² using an electrolytic bath comprising 45% by weight of phosphoric acid, 35% by weight of sulfuric acid and 3% by weight of chromic acid. The average mirror gloss of five representative points on the inside wall was 81%, and thus it was confirmed that the inside wall was in a high level of mirror-polishing.

To the 100-liter vessel were added 45 kg of deionized water, 30 g of polyvinyl alcohol (average polymerization degree, 850; average saponification degree, 75 mole %) and 12 g of a toluene solution containing 50% by weight of diisopropyl peroxydicarbonate. After deaeration in the vessel, 30 kg of vinyl chloride monomer was added, followed by polymerization at 57° C. with stirring. Pressure in the vessel at the beginning of polymerization was 8.7 kg/cm$^2$G. When the pressure dropped by 2 kg/cm$^2$ after 7 hours, the polymerization was stopped and unreacted vinyl chloride monomer was recovered. After the contents in the vessel were withdrawn, the vessel was washed with low-pressure water of 15 kg/cm$^2$G. By said washing with low-pressure water, the polymer particles loosely attached to the inside wall and the like were removed easily and completely.

A cycle of these operations was repeated for 10 days in 12 hours/cycle on the average, and thus 20 batches of polymerization were produced. Attachment of polymer particles and scale was not observed even after the 20th cycle was finished. By detailed observation of surface corrosion, it was further confirmed that corrosion such as pitting corrosion was not observed and that the surface was kept sound.

EXAMPLE 3

After the experiment in Example 2 comprising repetition of suspension polymerization was finished, an experiment by emulsion polymerization was carried out in the same vessel.

To the above 100-liter vessel were added 45 kg of deionized water, 24 g of potassium persulfate and 80 g of sodium laurylsulfate. After deaeration and replacement of air with nitrogen in the vessel, 34 kg of vinyl chloride monomer was added to the vessel, followed by polymerization at 53° C. with stirring. The polymerization was stopped at the time when pressure in the vessel dropped by 1 kg/cm$^2$. Unreacted vinyl chloride monomer was recovered and the contents in the vessel were withdrawn. Vinyl chloride polymer latex having an average particle size of 0.4µ was thus obtained. The thin film-like scale attached to the inside wall of the vessel after withdrawing the contents, could be completely removed by washing with low-pressure water of 30 kg/cm$^2$G.

A cycle of these operations was repeated for 10 days in 12 hours/cycle on the average, and thus 20 batches of polymerization were produced. Even after the 20th cycle was finished, accumulation of scale was not observed and the original gloss was still maintained. By detailed observation of surface corrosion, it was further confirmed that corrosions such as pitting corrosion and crevice corrosion were not observed and that the surface was kept sound.

COMPARATIVE EXAMPLE 1

Suspension polymerization of vinyl chloride was carried out under the same conditions as in Example 1, using a 100-liter SUS 316L polymerization vessel (the inside wall was surface-finished with a buff #300; mirror gloss 63%). After the polymerization was finished, the inside wall was washed by a jet of water of 100 kg/cm$^2$G. It was however impossible to completely remove the scale which was thin but firmly attached to the wall. The remaining scale was detached from the wall by scratching and weighed. The weight was 160 g.

COMPARATIVE EXAMPLE 2

Emulsion polymerization of vinyl chloride was carried out under the same conditions as in Example 3 using the same vessel as in Comparative Example 1. After the polymerization was finished, the inside wall of the vessel was washed by a jet of water of 100 kg/cm$^2$G. It was however almost impossible to remove the scale which was thin but very firmly attached to the wall. The remaining scale was detached from the wall by scratching and weighed. The weight was 330 g.

EXAMPLE 4

On the lower part of a buffle (a part completely soaked in reaction solution during polymerization) in a 22-m$^3$ glass-lined polymerization vessel for production of vinyl chloride polymers, were mounted test pieces [shape: 100 mm×100 mm×2 mm (thick)]. The material and level of surface-finishing of the test piece are shown in Table 3, and the chemical composition of the stainless steel used is shown in Table 4.

To the polymerization vessel were added 10,000 kg of deionized water, 5.6 kg of polyvinyl alcohol (average polymerization degree, 850; saponification degree, 75%) and 2.8 kg of a toluene solution containing 50% by weight of diisopropyl peroxydicarbonate. After deaeration in the vessel, 7,000 kg of vinyl chloride monomer was added, followed by polymerization at 57° C. with stirring. Pressure in the vessel at the beginning of polymerization was 8.7 kg/cm$^2$G. When the pressure dropped by 2 kg/cm$^2$ after 7 hours, the polymerization was stopped and unreacted vinyl chloride monomer was recovered. After the contents in the vessel were withdrawn, the vessel was washed with low-pressure water of 15 kg/cm$^2$G.

A cycle of these operations was repeated for about 6 months in 12 hours/cycle on the average, and thus 360 batches of polymerization were produced. During that period, the test pieces were detached at the times shown in Table 3, evaluated for degrees of scale attachment and corrosion and re-mounted followed by continuing the test.

Table 3

| Test piece No. | Material | State of surface-finishing Method | Mirror[1] gloss (%) | After first cycle Scale[2] attachment (g/m$^2$) |
|---|---|---|---|---|
| 1 | NAR-F | Polishing with a buff #400 followed by electropolishing | 81 | 0 |
| 2 | NTK R-4 | Same as above | 83 | 0 |
| 3 | NAS 45-M | Same as above | 77 | 0 |
| 4 | Sandvik 3RE60 | Same as above | 79 | 0 |
| 5 | NAR-F | Polishing alone with a buff #300 | 61 | 11 |
| 6 | NAS 45-M | Same as above | 63 | 7 |
| 7 | YUS 304 | Polishing with a buff #400 followed by electropolishing | 82 | 38 |
| 8 | YUS 316 | Same as above | 84 | 21 |
| 9 | YUS 316L | Same as above | 85 | 15 |

Note:
[1] Mirror gloss is measured according to the method No. 2 of JIS Z 8741 (1962) (the gloss of a mirror coated with vacuum-evaporated silver is taken as 100%)
[2] Values after washing with low-pressure water of 15 kg/cm$^2$G.

| After 60th cycle | | After 360th cycle | |
|---|---|---|---|
| Scale[2] | Corrosion | Scale[2] | Corrosion state |

Table 3-continued

| attachment (g/m²) | state (g/m²hr) | attachment (g/m²) | (g/m²hr) | Surface state |
|---|---|---|---|---|
| 0 | 0.001 | 0 | 0.002 | Sound |
| 0 | 0.002 | 0 | 0.003 | Sound |
| 0 | 0.003 | 0 | 0.003 | Sound |
| 0 | 0.003 | 0 | 0.003 | Sound |
| 25 | 0.005 | 47 | 0.085 | Many pits |
| 17 | 0.007 | 30 | 0.035 | Many pits |
| 67 | 0.015 | 270 | 0.316 | Many pits |
| 46 | 0.008 | 130 | 0.120 | Many pits |
| 45 | 0.007 | 95 | 0.065 | Many pits |

Table 4

| | | Chemical composition of stainless steel | | | | | | |
|---|---|---|---|---|---|---|---|---|
| | Manufacturing | Chemical component (weight %) | | | | | | |
| Material | company | C | Cr | Ni | Mo | Cu | Others | Remark |
| NAR-F | Nippon Stainless Co. | 0.02 | 25.1 | 5.1 | 1.6 | | | Duplex phase stainless steel |
| NTK R-4 | Nippon Kinzoku Kogyo Co. | 0.02 | 24.7 | 4.5 | 1.5 | | Ti: 0.2 | Same as above |
| NAS 45-M | Nippon Yakin Kogyo Co. | 0.02 | 24.0 | 5.0 | 1.5 | 1.5 | | Same as above |
| Sandvik 3RE60 | Sandvikens Co. (Sweden) | 0.01 | 18.5 | 4.7 | 2.7 | | Si: 1.7 | Same as above |
| YUS 304 | Shin-nippon Seitetsu Co. | 0.08 | 19.1 | 8.5 | — | | Mn: 1.5 | Austenitic stainless steel |
| YUS 316 | Same as above | 0.07 | 16.9 | 10 | 2.5 | | Mn: 1.5 | Same as above |
| YUS 316L | Same as above | 0.02 | 16.8 | 10 | 2.5 | | | |

The followings are apparent from the results in Table 3: The test pieces, No. 1 to No. 4, of the material and the level of surface-finishing according to the present invention do not show substantial scale attachment (which means firm scale attachment not removable by washing with low-pressure water of 15 kg/cm²G) at all not only over a short period of time but also over a long period of time, and besides they show slight progress of corrosion. On the other hand the test pieces, No. 5 to No. 6, which are made of the duplex phase stainless steel specified in the present invention but with poor surface-finishing, and those, No. 7 to No. 9, which are made of stainless steel other than those specified in the present invention, show firm scale attachment and rapid progress of corrosion, and the conditions become worse as the test period is prolonged.

EXAMPLE 5

The whole inside wall of a 100-liter SUS 316L polymerization vessel was strip-lined with a tanzaku-form thin plate (0.5 mm thick) made of NAR-F (chemical composition is shown in Table 4) and surface-finished sufficiently smoothly by mechanical polishing. The wall was then electropolished at 70° C. and current density of 50 A/dm² using an electrolytic bath comprising 45% by weight of phosphoric acid, 35% by weight of sulfuric acid and 3% by weight of chromic acid. The average mirror gloss of five representative points on the inside wall was 80%, and thus it was confirmed that the inside wall was in a high level of mirror-polishing.

To the 100-liter vessel were added 45 kg of deionized water, 30 g of polyvinyl alcohol (average polymerization degree, 850; average saponification degree, 75 mole %) and 12 g of a toluene solution containing 50% by weight of diisopropyl peroxydicarbonate, After deaeration in the vessel, 30 kg of vinyl chloride monomer was added, followed by polymerization at 57° C. with stirring.

Pressure in the vessel at the beginning of polymerization was 8.7 kg/cm²G. When the pressure dropped by 2 kg/cm² after 7 hours, the polymerization was stopped and unreacted vinyl chloride monomer was recovered. After the contents in the vessel were withdrawn, the vessel was washed with low-pressure water of 15 kg/cm²G. By said washing with low-pressure water, the polymer particles loosely attached to the inside wall and the like were removed easily and completely.

A cycle of these operations was repeated for 10 days in 12 hours/cycle on the average, and thus 20 batches of polymerization were produced. Attachment of polymer particles and scale was not observed even after the 20th cycle was finished. By detailed observation of surface corrosion, it was further confirmed that corrosion such as pitting corrosion was not observed and that the surface was kept sound.

EXAMPLE 6

After the experiment in Example 5 comprising repetition of suspension polymerization was finished, an experiment by emulsion polymerization was carried out in the same vessel.

To the above 100-liter vessel were added 45 kg of deionized water, 24 g of potassium persulfate and 80 g of sodium laurylsulfate. After deaeration and replacement of air with nitrogen in the vessel, 34 kg of vinyl chloride monomer was added to the vessel, followed by polymerization at 53° C. with stirring. The polymerization was stopped at the time when pressure in the vessel dropped by 1 kg/cm². Unreacted vinyl chloride monomer was recovered and the contents in the vessel were withdrawn. Vinyl chloride polymer latex having an average particle size of $0.4\mu$ was thus obtained. The thin film-like scale attached to the inside wall of the vessel after withdrawing the contents, could be completely removed by washing with low-pressure water of 30 kg/cm²G.

A cycle of these operations was repeated for 10 days in 12 hours/cycle on the average, and thus 20 batches of polymerization were produced. Even after the 20th cycle was finished, accumulation of scale was not observed and the original gloss was still maintained. By detailed observation of surface corrosion, it was further confirmed that corrosions such as pitting corrosion and crevice corrosion were not observed and that the surface was kept sound.

COMPARATIVE EXAMPLE 3

Suspension polymerization of vinyl chloride was carried out under the same conditions as in Example 4, using a 100-liter SUS 316L polymerization vessel (the inside wall was surface-finished with a buff #300; mirror gloss 63%). After the polymerization was finished, the inside wall was washed by a jet of water of 100 kg/cm²G. It was however impossible to completely remove the scale which was thin but firmly attached to the wall. The remaining scale was detached from the wall by scratching and weighed. The weight was 160 g.

COMPARATIVE EXAMPLE 4

Emulsion polymerization of vinyl chloride was carried out under the same conditions as in Example 6 using the same vessel as in Comparative Example 3. After the polymerization was finished, the inside wall of the vessel was washed by a jet of water of 100 kg/cm²G. It was however almost impossible to remove the scale which was thin but very firmly attached to the wall. The remaining scale was detached from the wall by scratching and weighed. The weight was 330 g.

What is claimed is:

1. Equipment for polymerization of vinyl chloride monomers characterized in that the inside wall of the polymerization vessel and/or the surface of attachments to the vessel which are brought into contact with said monomers are wholly or partially made of mirror-polished ferritic stainless steel containing 15 to 40% by weight of chromium, 0.5 to 5% by weight of molybdenum, not more than 0.5% by weight of nickel, not more than 0.05% by weight of carbon and not more than 0.05% by weight of nitrogen, or mirror-polished duplex phase stainless steel comprising a ferritic phase and an austenitic phase containing 17 to 35% by weight of chromium and 2 to 8% by weight of nickel.

2. Equipment according to claim 1, wherein said ferritic stainless steel contains 17 to 35% by weight of chromium, 1 to 3% by weight of molybdenum, not more than 0.3% by weight of nickel, not more than 0.02% by weight of carbon and not more than 0.02% by weight of nitrogen.

3. Equipment according to claim 1 or 2, wherein the level of mirror-polishing of said stainless steels is 75% or more, as expressed according to the method No. 2 of JIS Z-8741 (1962) in which a mirror coated with vacuum-evaporated silver is taken as a standard and its gloss is taken as 100%.

4. A process for polymerization of vinyl chloride monomers which comprises subjecting vinyl chloride monomer alone or mixtures comprising vinyl chloride monomer as a main component and a monomer copolymerizable therewith to radical polymerization in the presence of a radical-generating catalyst in an aqueous medium using equipments for polymerization of vinyl chloride monomers in which the inside wall of the polymerization vessel and/or the surface of attachments to the vessel which are brought into contact with said monomers are wholly or partially made of mirror-polished ferritic stainless steel containing 15 to 40% by weight of chromium, 0.5 to 5% by weight of molybdenum, not more than 0.5% by weight of nickel, not more than 0.05% by weight of carbon and not more than 0.05% by weight of nitrogen, or mirror-polished duplex phase stainless steel comprising a ferritic phase and an austenitic phase containing 17 to 35% by weight of chromium and 2 to 8% by weight of nickel.

* * * * *